United States Patent [19]

Nagel

[11] Patent Number: 5,759,107
[45] Date of Patent: Jun. 2, 1998

[54] GYROSCOPIC AMUSEMENT APPARATUS

[75] Inventor: Larry Nagel, Chino Hills, Calif.

[73] Assignee: Amusement Technologies, Inc., Mesa, Calif.

[21] Appl. No.: 724,843

[22] Filed: Oct. 3, 1996

[51] Int. Cl.[6] .................................................. A63G 1/10
[52] U.S. Cl. ............................ 472/47; 472/60; 434/55
[58] Field of Search .............................. 472/29, 31, 33, 472/47, 59, 60, 27, 28, 130; 434/29, 55, 57, 30, 33

[56] References Cited

U.S. PATENT DOCUMENTS

| | | |
|---|---|---|
| 846,925 | 3/1907 | Kramer. |
| 1,342,871 | 6/1920 | Ruggles. |
| 3,141,669 | 7/1964 | Chul .................................. 272/33 |
| 3,164,382 | 1/1965 | Johnson ............................ 272/33 |
| 3,276,777 | 10/1966 | Pruitt, Sr. ........................ 272/33 |
| 4,402,500 | 9/1983 | Coles ................................ 272/33 |
| 4,799,667 | 1/1989 | Suchy ............................... 272/36 |
| 4,824,099 | 4/1989 | Rusu et al. ...................... 272/33 |
| 5,046,721 | 9/1991 | Altare .............................. 272/36 |
| 5,255,211 | 10/1993 | Redmond ....................... 364/578 |
| 5,342,244 | 8/1994 | Nelson ............................ 472/14 |
| 5,490,784 | 2/1996 | Carmein ......................... 434/29 |

*Primary Examiner*—Kien T. Nguyen
*Attorney, Agent, or Firm*—Edward D. Gilhooly, Ltd.

[57] ABSTRACT

A gyroscopic amusement apparatus including a cradle having upright supports and carrying a pair of concentric rings capable of rotation about perpendicular axis. A hydraulic motor is supported on one of the upright supports and drives the outer ring bi-directionally about a horizontal axis. A second hydraulic motor is mounted on the outer ring and drives the inner ring about a vertical axis. A seat is supported within the inner ring to support an operator and a video display unit and control stick are sued by the operator to control rotation of the rings and the image on the video display unit.

18 Claims, 7 Drawing Sheets

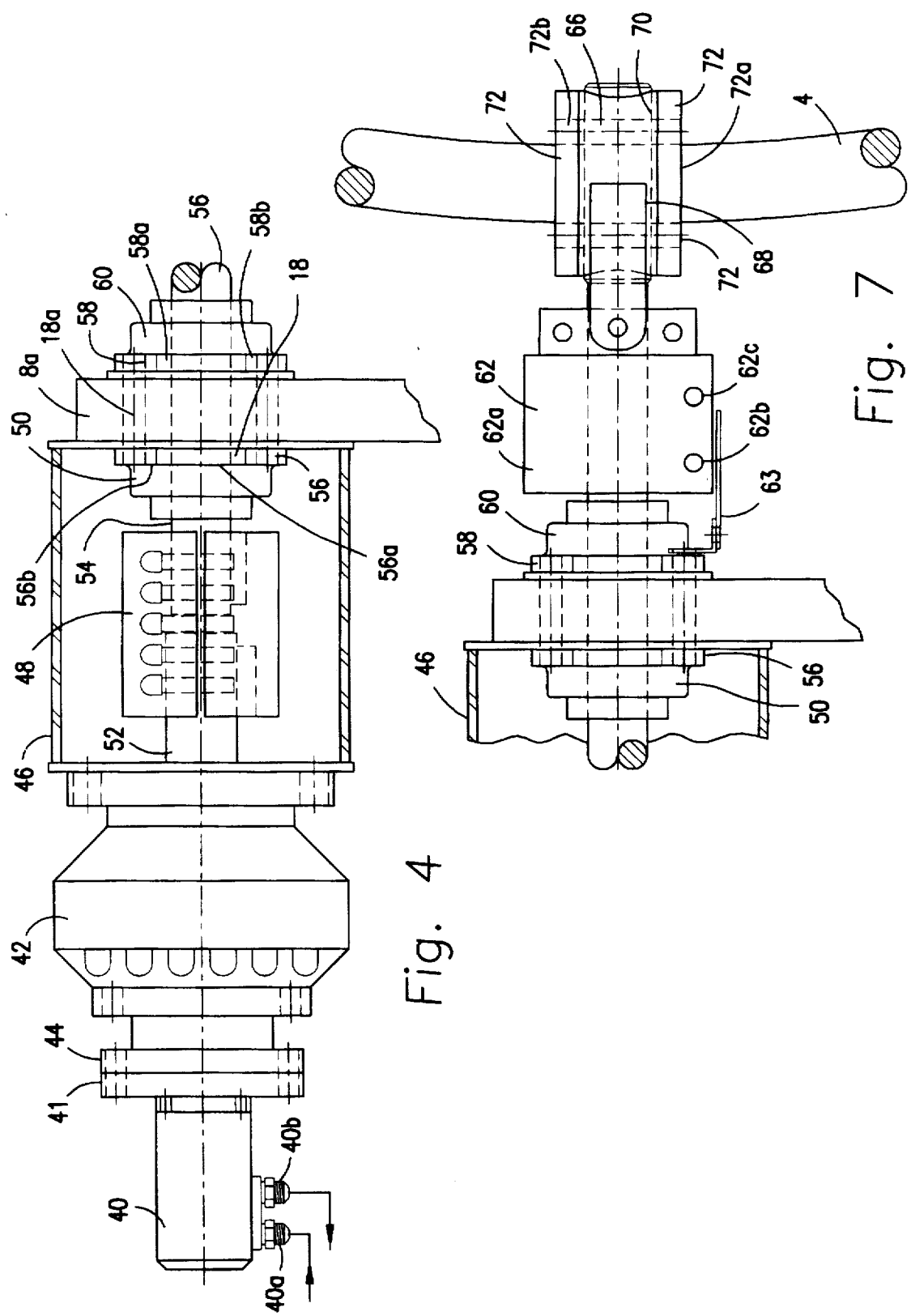

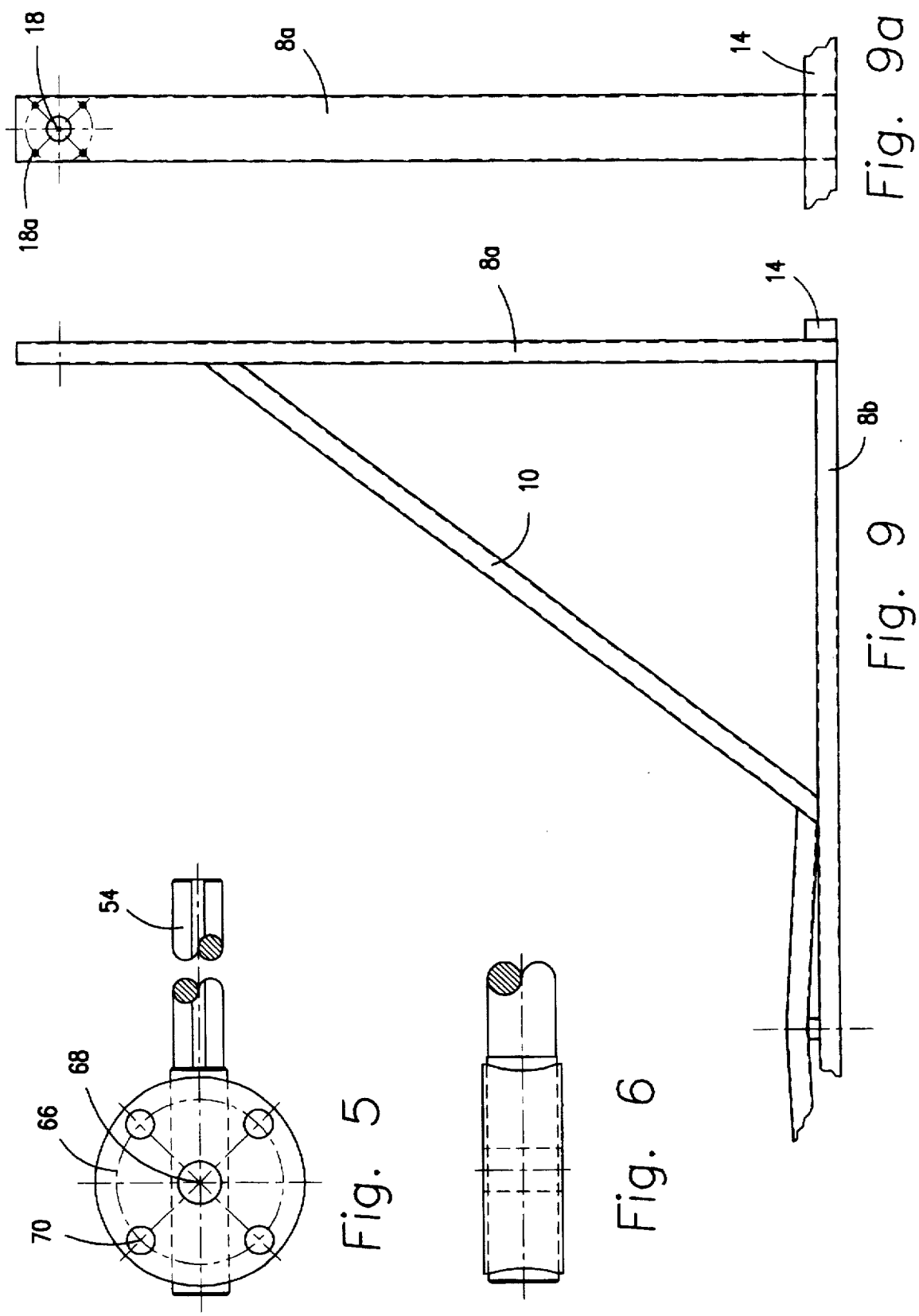

5,759,107

GYROSCOPIC AMUSEMENT APPARATUS

BACKGROUND OF THE INVENTION

1. Field of the Invention

This invention relates in general to amusement equipment and, more particularly, to a gyroscopic amusement apparatus capable of undergoing complex three hundred and sixty degree motions in conjunction with a virtual reality head mounted display and a hydraulically operated motion based platform.

2. Summary of the Prior Art

Numerous types of rides and other amusement equipment have long been popular as an entertainment form for children and adults. These forms of entertainment provide visual and physical stimulation to the delight of the individual. In the past, attempts have been made to create an amusement apparatus based on the principle of the gyroscope. Several of the prior gyroscopic devices were man-powered by which concentric rings could be swung about multiple axes by an operator shifting his weight at a station on the equipment. Although this type of gyroscopic device produces multiple movements, the sensory stimulation of the rider is relatively limited because its motion is generated by the rider. Others systems have been developed to cause movement of a gyroscopic type apparatus through the use of motor means and the like. These motorized attempts to power a gyroscopic amusement device have only been capable of limited stimulation to the rider. None of the prior gyroscopic type equipment have combined the effective use of the complex motions of the gyroscope in the form of concentric rings with a visual stimulation to the rider for an enhanced sensation. For these reasons, it is desirable to provide an improved gyroscopic amusement apparatus capable of multiple motions with a visual stimulation to the rider.

SUMMARY OF THE INVENTION

It is therefore an objective of the invention to provide an improved amusement ride that combines a virtual reality head mounted display (HMD) and a hydraulically operated motion based platform. The rider of the apparatus sits within two concentric rings which are capable of undergoing three hundred and sixty degree infinite rotation about a vertical and horizontal axis or other axes if desired. The head set used by the rider may visually display any type of visual situation such as, for example, a cockpit view of a jet fighter about to engage in combat. As the pilot or rider views the HMD, the amusement apparatus responds to his signals with electric over hydraulic systems controlling the basic movement by supplying an electrical signal to hydraulic solenoids. Through the hydraulic solenoids, hydraulic motors are controlled by the pilot in a manner to induce the infinite degrees of movement. The outer larger ring of the invention is controlled by hydraulic motor attached to a gear reducer to act as a drive for the X-axis, such as horizontal, to control up and down movement. The motion about the Y-axis (i.e. vertical axis) is provided by the inside ring through a gear reducer and drive axle. The invention of the application provides a highly stimulating amusement apparatus combining the complex motions of a gyroscope with visual control.

BRIEF DESCRIPTION OF THE DRAWINGS

FIG. 4 is a partial front elevational view of the left side drive assembly of the amusement apparatus of FIG. 1;

FIG. 5 is a side elevational view of a banjo pin used in the drive assembly of FIG. 4;

FIG. 6 is a front top plan view of a banjo assembly of FIG. 5;

FIG. 7 is a side elevational view showing the outer ring drive of the left side drive assembly of FIG. 1;

FIG. 9 is a partial front elevational view of the cradle of the amusement apparatus of FIG. 1;

FIG. 9a is a side elevational view of a portion of the upright tube of the cradle of FIG. 9;

DESCRIPTION OF THE PREFERRED EMBODIMENT

Figure 1:
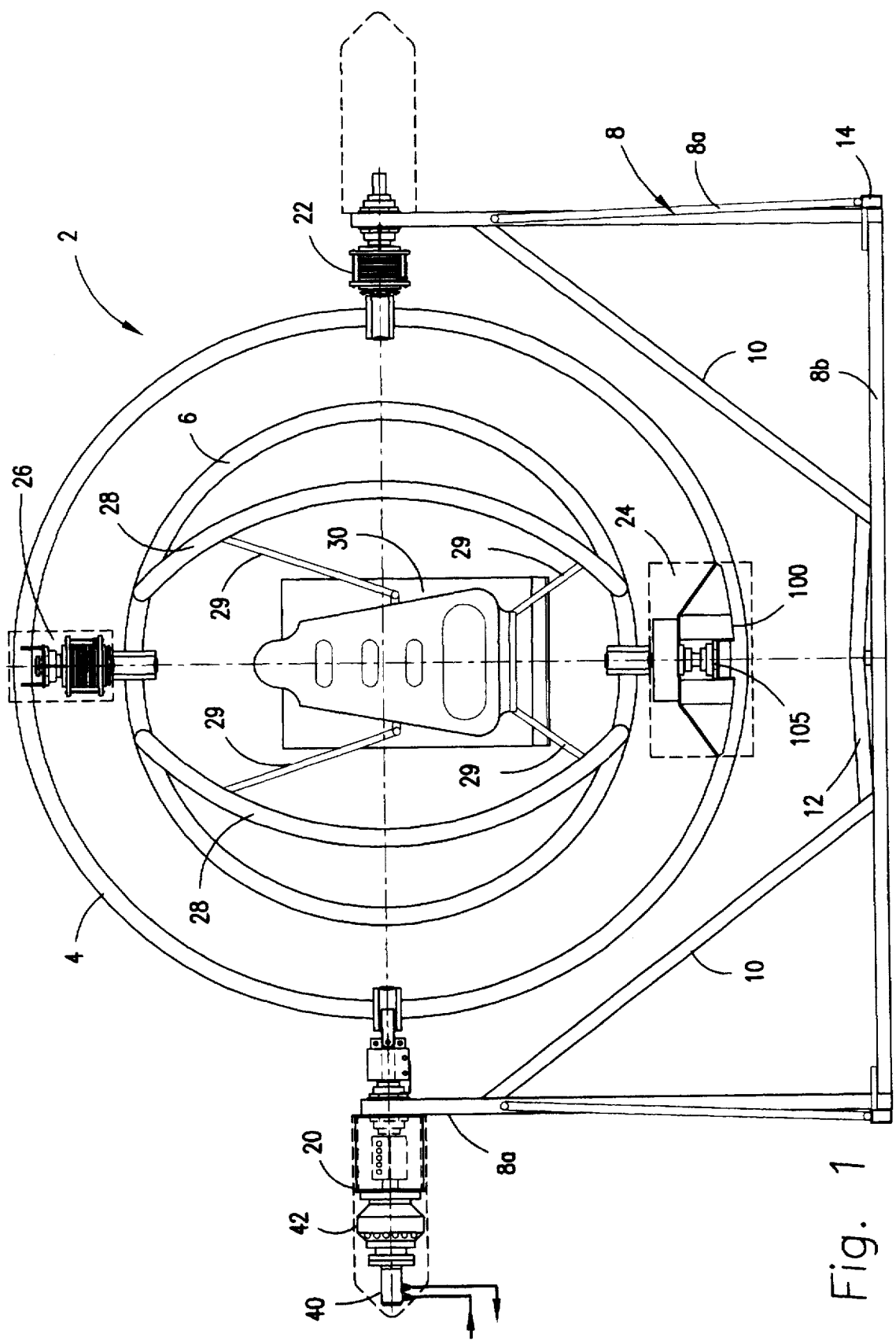
FIG. 1 is a front elevational view of the amusement apparatus of the invention.
Figure 2:
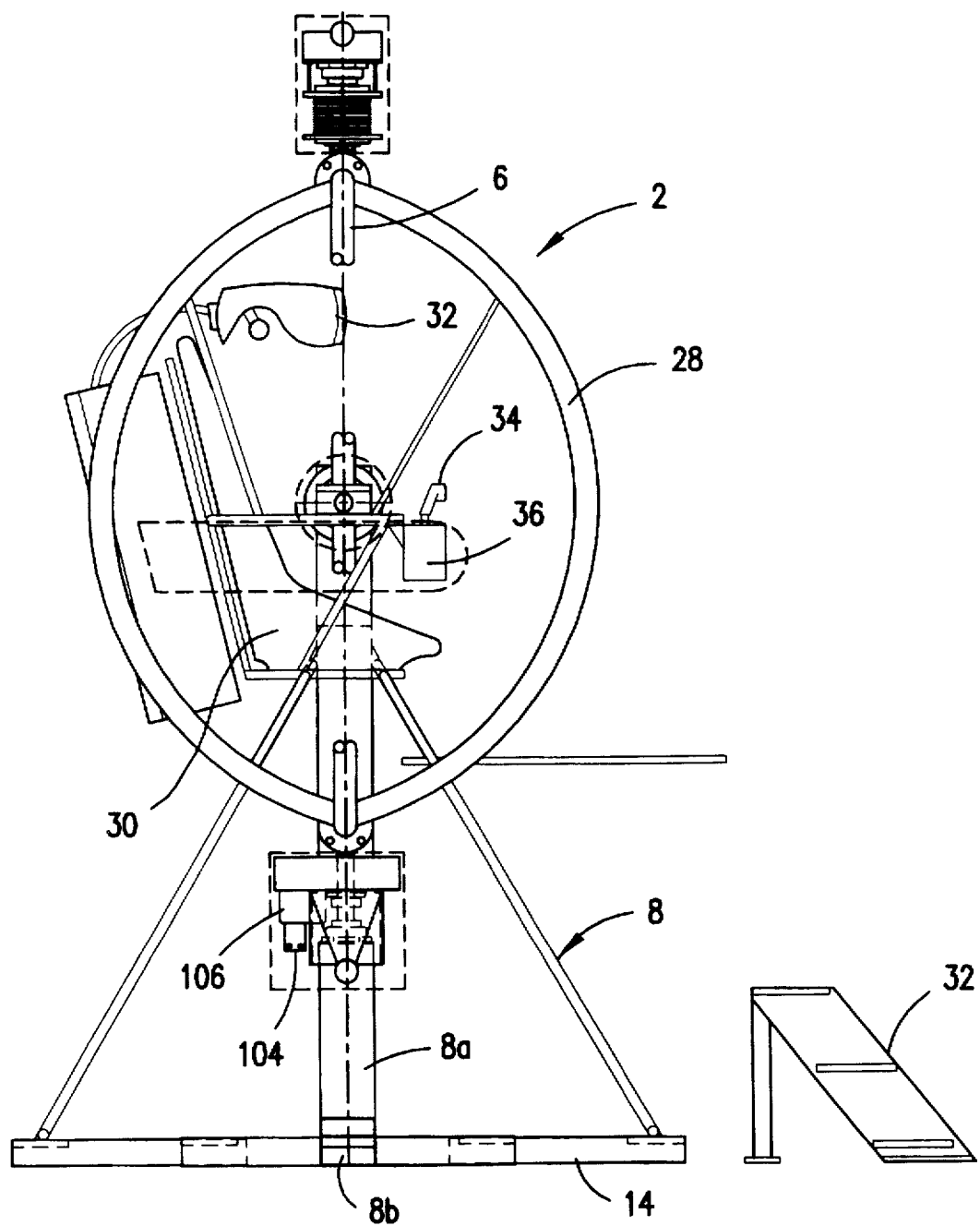
FIG. 2 is a side elevational view, with parts removed, of the amusement apparatus of FIG. 1.
Figure 3:
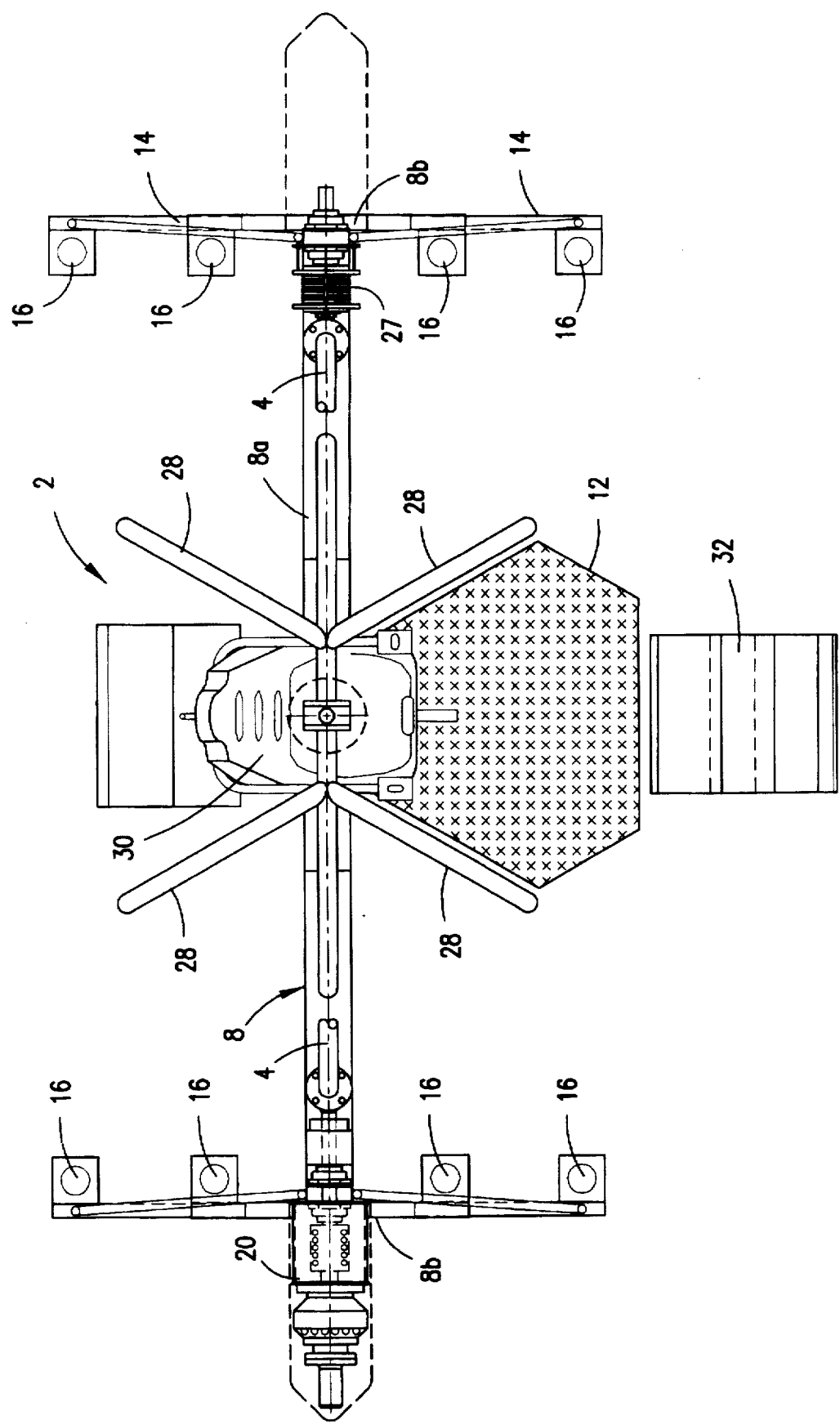
FIG. 3 is a top plan view, with parts removed, of the amusement apparatus of FIG. 1.
Figure 11:
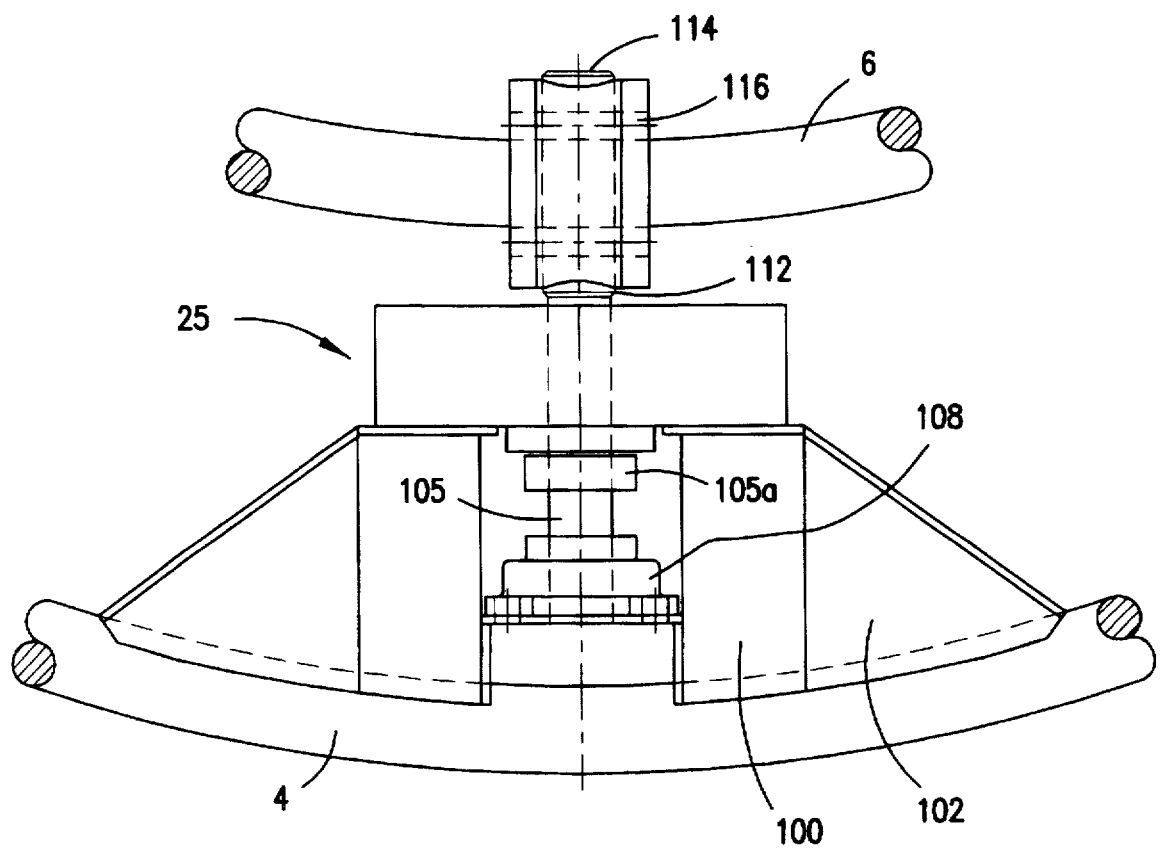
FIG. 11 is a front elevational view of the hydraulic drive and speed reducer of the inner ring of the amusement apparatus of FIG. 1.

Referring now to FIGS. 1, 2, and 3, there is illustrated the gyroscopic amusement apparatus of the invention, generally designated by reference numeral 2. The gyroscopic amusement apparatus 2 includes an outer ring 4 mounted for three hundred and sixty degree rotational movement about a horizontal axis and an inner tubular ring 6 mounted for three hundred sixty degree movement about a vertical axis by drive means to be described. The outer ring 4 and inner ring 6 are supported by a base cradle 8 having a pair of upright beams 8a and a lower horizontal beam 8b as seen in FIGS. 1, 2, 3, 9, and 9a. The opposed upright vertical support beams 8a are reinforced by diagonal tubes 10 suitably affixed to beam 8b and to an upper portion of the vertical support beams 8a. The cradle 8 further supports a platform 12 beneath the rings 4 and 6 and has a roughened surface to enable a user to safely mount the amusement apparatus. A pair of lower slip tubes 14 are mounted on the end of lower beam 8a and carry a plurality of casters 16 to adjust the base of the cradle 8. The slip tube 14 includes an inner and outer tube arrangement which are telescopically mounted to adjust their length for adjustment purposes. As best seen in FIG. 11, the upper portion of the upright support beam 8a includes a central hole and a plurality of bolt holes 18a.

On the left side of gyroscopic apparatus 2, a left side drive and hydraulic swivel unit 20 is supported on upright beam 8a through hole 18 and connects the cradle 8 to the outer ring 4 of the gyroscopic apparatus. Similarly, an electric swivel assembly 22 is mounted through hole 18 on the right side of the gyroscopic amusement apparatus 2 as shown in FIG. 1. Further in FIG. 1, a lower drive 24 is mounted on the outer ring 4 in attachment to the inner ring 6 for rotational movement of the inner ring 6 about a second axis, generally the vertical axis. An upper electric swivel assembly 26 is also attached to the outer ring 4 and is attached to the inner ring 6.

As seen in FIG. 2 and 3, four semi-circular tubes 28 are angularly arranged and are attached by a suitable attachment technique to the inner ring 6 on both sides of the plane of the inner ring 6 as shown in FIG. 3. A plurality of struts in the form of rods 29 are affixed to the inner portion of the inner ring 6 and support a seat assembly 30 positioned generally at the center of rotation of the outer ring 4 and inner ring 6. A stair assembly 32 (FIGS. 2 and 3) may be used to allow access to the platform beneath the seat assembly 30. As seen in FIG. 2, a head mount display unit 32 supplied by a liquid image is mounted above the seat assembly 30. A joy stick 34 is mounted on a console 36 in the front of the seat assembly 30.

Figure 8:
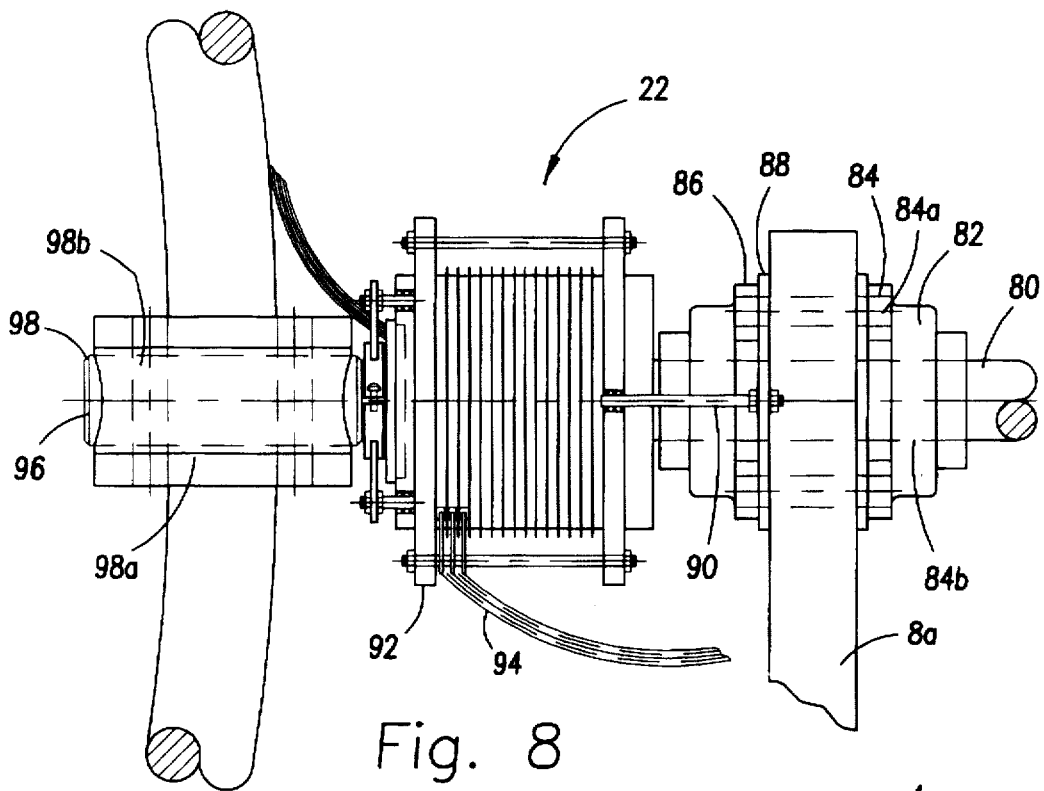
FIG. 8 is a front elevational view of the right side slip ring of the amusement apparatus of FIG. 1.

Referring now to FIGS. 1, 4, and 8, details of the left side drive and hydraulic swivel unit 20 are shown. A hydraulic motor 40 of conventional design is affixed to the end of unit 20 and is in fluid communication with a source of hydraulic fluid (not shown) through ports 40a, 40b. The flow of fluid is reversible dependent on the desired direction of rotation of the outer ring 4. The rotary output shaft of hydraulic motor 40 is coupled to a conventional gear reducer 42 capable of reducing the output by a selected amount such as, for example, a 20:1 ratio. The rotational output of the hydraulic motor 40 is coupled to the gear reducer 42 by connected discs 44 which are respectfully attached to the output shaft of hydraulic cylinder 40 and the input shaft of gear reducer 42. Although any similar hydraulic motor may be used for hydraulic motor 40, a commercial available hydraulic motor sold as a White Model No. RS100401 is suitable. The gear reducer 42 may comprise any type of gear drive such as, for example, a Brevini Gear Drive, Model No. ED2020/MR2/10/00/SAE/A/BBK.

In housing 46, the output shaft 52 of gear drive 42 is operably connected to a banjo pin 54 through a coupler 48 and the banjo pin 54 further extends through pillow box bearing 50. The pillow box bearing 50 may comprise a conventional bearing block, such as, for example, a pillow box bearing sold under the trademark Sealmaster Model No. SF31. The coupler 48 transmits rotation from output shaft 52 within housing 46 to the end of banjo pin 54. The banjo pin 54 further extends through a suitable disc mounting 56 having a central opening 56a and threaded openings 56b corresponding to openings 18, 18a of the upright cradle support 8a on the left side. A similar disc mounting 58 is mounted on the inner side of upright member 8a and has a central opening 58a and holes 58b in alignment with holes 56a, 56b and 18, 18a in manner to support the unit 20 by means of threaded members or the like (not shown). The banjo pin 54 is also directed through pillow box 60 as shown in FIGS. 4 and 8 and a hydraulic swivel 62. The outer housing 62a of hydraulic swivel 62 is fixed against rotation by bracket 63. The hydraulic swivel includes ports 62a and 62b and two other ports (not shown) connected to the source of hydraulic fluid through hoses (not shown). Two additional hoses (not shown) are coupled to two of the ports to deliver hydraulic fluid to drive 24 for operation. The banjo pin 54 includes circular plate portion 66 at its end through which a receiving hole 68 for outer ring 4 and threaded attachment holes 70 are drilled. As seen in FIG. 7, end rings 70 are disposed in attached relationship on each side of circular plate portion 66 to form a unitary structure coupling outer ring 4 to the output of the drive. The end rings 70 have a ring receiving opening 72 and attachment holes 74 corresponding to the banjo pin 54 to receive respectively the inner ring 4 and mechanical fasteners (not shown). The hydraulic motor 40 thus causes the outer ring 4 to swivel or rotate bi-directionally for 360 degrees about a first axis, generally horizontal or other selected axis.

Referring to FIGS. 1 and 8, details of the right side electric swivel assembly 22 are shown. The right side electric swivel assembly 22 includes a shaft 80 that extends through a pillow box 82. The pillow box 82 is mounted on the right upright support 8a by means of a circular plate 84 having a plurality of angularly arranged attachment holes 84a and a central hole 84b matching the hole arrangement of the upright support 8a. The right side electric swivel assembly 22 further includes a bearing 86 and a plate 88 affixed by threaded members to the upright support 8a in conjunction with plate 84 to form a bearing structure. A plurality of anti-rotational pins 90 are affixed to the plate 88 and to a conventional electric slip ring 92 connected to a source of electric potential through electric leads 94. The output of the slip rings 92 is affixed to a banjo pin 96 by means of a barrel clamp 96. The banjo pin 96 includes a circular plate portion 98 at its inner end having a central opening 98a and attachment holes 98b. The plate 98 is interconnected to end rings 99 by mechanical fasteners (not shown). The end rings 99 have a central opening 99a and attachment holes 98b to receive outer ring 4 permitting rotation of ring 4 about the same axis as drive unit 20. Electrical leads (not shown) are connected to a stationary portion of slip ring 92 and are coupled to the head set, monitor, and computer of the control system in a manner to be described.

Referring now to FIGS. 1, 2, 11, and 12, the inside gear drive and hydraulic drive motor assembly 24 is best shown. The assembly 24 includes a housing 100 being affixed to the outer ring 4 by means of an attachment assembly 102. The housing 100 encloses a hydraulic drive motor 104 connected by a drive shaft 105 through bearings 105a to a hollow output shaft gear reducer 106 as illustrated in FIG. 2. A shaft 110 of a banjo pin 112 having an upper cylindrical end 114 extends upward. The ring 6 extends through the opening 114a of cylindrical end 114 and is retained thereon by rings 116 and threaded members (not shown). The inner ring 6 is rotatable about a vertical axis by the hydraulic drive motor 104.

Figure 10:
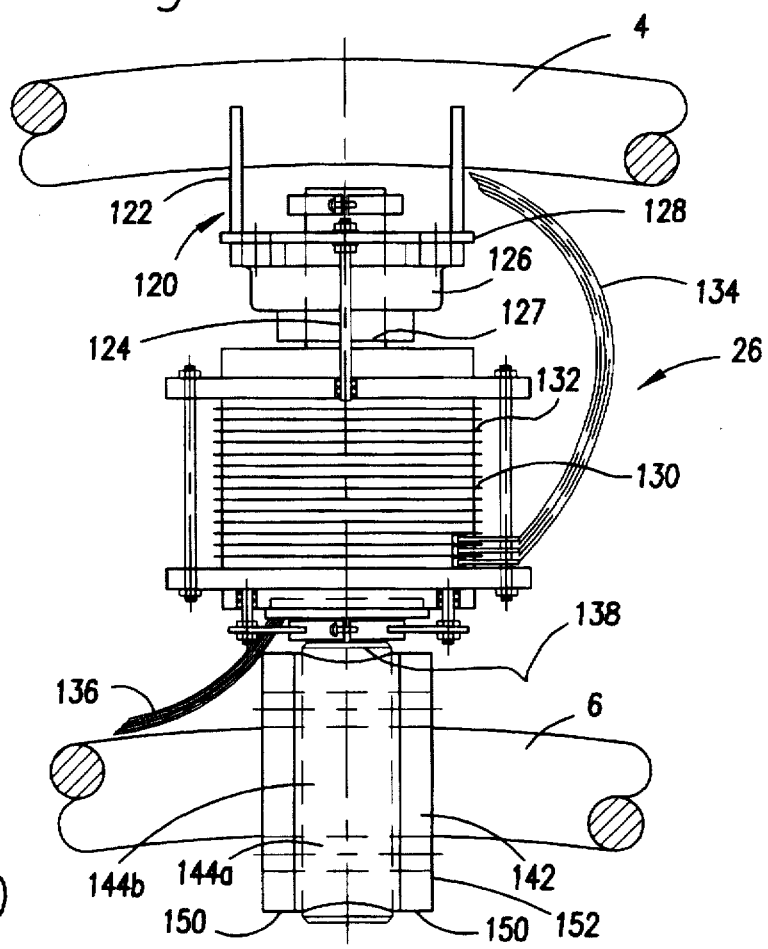
FIG. 10 is a side elevational view of the upper inside slip ring assembly of the amusement apparatus of FIG. 1.
Figure 12:
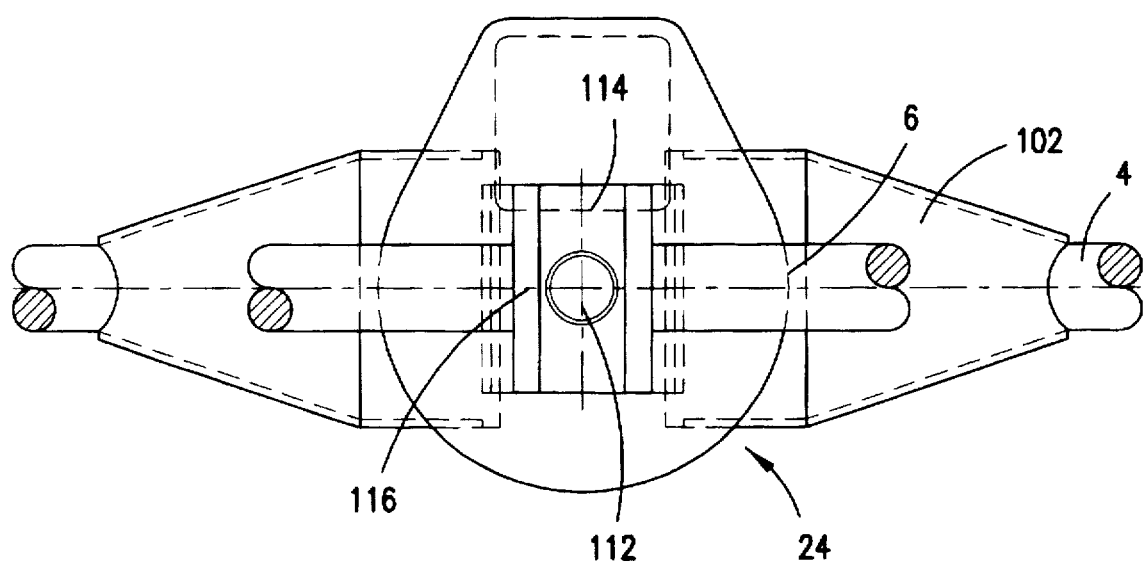
FIG. 12 is a top plan view of the hydraulic drive and speed reducer of FIG. 11.

Referring now to FIGS. 1 and 10, the upper electric swivel assembly 26 is affixed to outer ring 4 by a suitable attachment by a bearing and saddle assembly 120. The saddle and bearing assembly 120 is affixed to the outside ring 4 by saddle 122 and includes a bearing 126 permitting rotation of the inner shaft 127. A plurality of anti-rotation pins 124 are affixed to plate 128 of the saddle 122 and are attached to an electric slip ring 132 having a plurality of contacts 130 with a power supply through power-in leads 134 being connected to conductors from slip ring 92 and power-out leads 136. The leads 136 from electric slip ring 132 are directed to power the components of the apparatus 2 such as the head set, electrical controls, lights, CPU, and the like needed for operation. A banjo pin 138 extends into the slip ring 132 for rotation and is affixed to the slip ring 128 by means of a barrel clamp 140 with the shaft of the banjo pin 142 extending into the slip ring 132. The cylindrical disk 141 of banjo pin 138 includes a plurality of fastening holes 144a arranged about an inner ring receiving opening 144b. A pair of attachment rings 150 having aligned holes 152 are attached as a unit to banjo pin 152 and the ring 6.

In operation, the operator is provided with the head mounted display unit 32 and the joy stick 34 is mounted forward. The joy stick 32 is electrically connected to conventional electrically controlled hydraulic solenoids (not shown) which control the delivery and the direction of the flow of hydraulic fluid to hydraulic motor 40 and hydraulic motor 104. The joy stick 34 and monitor 32 are also electrically connected to a computer (CPU) (not shown) in conjunction which is being operated by virtual reality software being used. By pulling back on the joy stick, the hydraulic solenoids (not shown) cause the fluid to be delivered to the hydraulic motor 40 for control of the rotation and speed of the outer ring 4 in a first direction. The joy stick is further electrically connected to the CPU to control the image on the monitor of the virtual reality image seen by the operator. By pushing the joy stick forward, the flow to hydraulic motor 40 is reversed by the hydraulic solenoids (not shown) to cause the outer ring 4 to rotate in the opposite direction. Similarly, by pushing the joy stick to one side or the other, control of the direction and speed of rotation of inner ring 6 is provided. As should be appreciated, the image on display unit 32 changes in accordance with movement of the joy stick 34 and the software. Combinations of movements of both rings 4 and 6 can be obtained by various positioning of the joy stick 34.

What is claimed is:

1. A gyroscopic amusement apparatus comprising base means, said base means having spaced upright supports, ring means being rotatably supported on said upright supports, said ring means includes an outer ring and an inner ring being concentric to said outer ring, power means being supported on one of said upright supports and being operatively connected to said outer ring, said power means acting to selectively rotate said outer ring in opposite directions, second power means being operatively connected to said inner ring to selectively rotate said inner ring in opposite directions about a second axis, and control means operatively connected to said power means and said second power means to control rotation and direction of rotation of said outer ring and said inner ring.

2. The gyroscopic amusement apparatus according to claim 1 wherein said second axis is perpendicular to said first axis.

3. The gyroscopic amusement apparatus according to claim 2 wherein said first axis is disposed along an horizontal direction.

4. The gyroscopic amusement apparatus according to claim 2 wherein said power means includes a hydraulic motor.

5. The gyroscopic amusement apparatus according to claim 4 wherein said second power means includes a second hydraulic motor.

6. The gyroscopic amusement apparatus according to claim 5 wherein said power means includes a rotatably drive shaft extending from said hydraulic motor, connection means for connecting said output drive shaft to said outer ring, said means for connecting including a pin means having a drive shaft formed with an enlarged end portion, said enlarged end portion having an opening for receiving said outer ring for rotation.

7. The gyroscopic amusement apparatus according to claim 1 wherein said second power means is supported on said outer ring.

8. The gyroscopic amusement apparatus according to claim 7 further including said inside ring swivel means, said inside ring swivel means being carried by said outer ring and permitting rotation of said inner ring about said second axis.

9. The gyroscopic amusement apparatus according to claim 8 wherein said inside ring swivel means further includes an electric slip ring, said electric slip ring connect electric conductors to deliver electrical power without rotation of said electric conductors during rotation of said second ring.

10. The gyroscopic amusement apparatus according to claim 1 further including conduit means being coupled to said power means, swivel means carried by said power means and connecting said conduit means against movement during rotation of said outer ring, said conduit means being connected to said second power means.

11. The gyroscopic amusement apparatus according to claim 1 further including swivel means for rotatably mounting said outer ring on the other of said upright supports.

12. The gyroscopic amusement apparatus according to claim 11 wherein said swivel means further includes an electric slip ring, power-in conductor means connected to said electric slip ring for receiving electrical power from a source of electrical potential, power-out conductor means being connected to said electric slip ring in connection to said power-in conductor to direct power within said second ring, said electric slip ring acting to prevent rotation of said power-in and power-out conductor.

13. The gyroscopic amusement apparatus according to claim 1 further including seat support means being mounted on said inner ring, seat means for supporting an operator being carried within said inner ring by said seat support means.

14. The gyroscopic amusement apparatus according to claim 13 wherein said seat support means includes a plurality of circular ring segments, a plurality of rods being carried by said ring segments and supporting said seat means.

15. The gyroscopic amusement apparatus according to claim 1 further includes a video display unit being supported by said seat support means for viewing by the operator, said video display unit being connected to said control means.

16. The gyroscopic amusement apparatus according to claim 15 further including a manual control element being supported on said seat support means adjacent said set means for manipulation by the operator, said manual control element being connected to said control means and acting to control rotation of said outer ring and inner ring and control the display on said video display unit.

17. A gyroscopic amusement apparatus comprising base means, said base means concentrally supporting an outer ring and an inner ring for rotation in opposite directions respectively about different axis, first power means being supported on said base means and being operatively connected to said outer ring, said power means acting to cause rotation of said outer ring, and said power means having a rotatable output shaft, said output shaft having an end portion formed with an opening, and said outer ring being disposed within said opening for rotation.

18. The gyroscopic amusement apparatus according to claim 17 further including second power means being supported on said outer ring and causing rotation of said inner ring.

* * * * *